(12) United States Patent
Kwak et al.

(10) Patent No.: US 7,616,268 B2
(45) Date of Patent: Nov. 10, 2009

(54) LIQUID CRYSTAL DISPLAY PANEL AND FABRICATING METHOD THEREOF

(75) Inventors: Dong Yeung Kwak, Daegu (KR); Chul Sang Shin, Cheonan-si (KR)

(73) Assignee: LG Display Co., Ltd., Seoul (KR)

( * ) Notice: Subject to any disclaimer, the term of this patent is extended or adjusted under 35 U.S.C. 154(b) by 379 days.

(21) Appl. No.: 11/258,952

(22) Filed: Oct. 27, 2005

(65) Prior Publication Data

US 2006/0098133 A1 May 11, 2006

(30) Foreign Application Priority Data

Nov. 10, 2004 (KR) .................... 10-2004-0091581

(51) Int. Cl.
*G02F 1/1333* (2006.01)
(52) U.S. Cl. .................... 349/54; 349/55; 349/192; 349/187
(58) Field of Classification Search .................... 349/40, 349/54, 192, 55, 187
See application file for complete search history.

(56) References Cited

U.S. PATENT DOCUMENTS

| | | | | |
|---|---|---|---|---|
| 5,859,679 | A * | 1/1999 | Song ............................ | 349/54 |
| 6,111,621 | A * | 8/2000 | Kim et al. ...................... | 349/54 |
| 6,429,908 | B1 * | 8/2002 | Lim .............................. | 349/54 |
| 6,969,872 | B2 * | 11/2005 | Kim ............................. | 257/72 |
| 2004/0012727 | A1 * | 1/2004 | Kim et al. ...................... | 349/54 |
| 2004/0095549 | A1 * | 5/2004 | Moon .......................... | 349/192 |
| 2004/0150765 | A1 * | 8/2004 | Ueda et al. ..................... | 349/54 |
| 2005/0270434 | A1 * | 12/2005 | Jung et al. ..................... | 349/43 |
| 2006/0001792 | A1 * | 1/2006 | Choi ............................ | 349/54 |
| 2006/0012728 | A1 * | 1/2006 | Watamura ..................... | 349/43 |
| 2006/0033857 | A1 * | 2/2006 | Kim et al. ...................... | 349/54 |
| 2006/0197885 | A1 * | 9/2006 | Tseng et al. ................... | 349/54 |

\* cited by examiner

*Primary Examiner*—David Nelms
*Assistant Examiner*—Thanh-Nhan P Nguyen
(74) *Attorney, Agent, or Firm*—McKenna Long & Aldridge

(57) ABSTRACT

A liquid crystal display panel according to an embodiment of the present invention includes a first shorting bar inspecting a signal line in a non-display area of a first substrate; a second shorting bar inspecting the signal line in the non-display area of the inspected first substrate attached to a second substrate; a first shorting line connected to at least one of the signal lines and the first and second shorting bars; and a second shorting line connected the second shorting bar with the remaining signal line except the signal line connected to the first shorting line.

13 Claims, 14 Drawing Sheets

LIQUID CRYSTAL DISPLAY PANEL AND FABRICATING METHOD THEREOF

This application claims the benefit of the Korean Patent Application No. P2004-91581 filed on Nov. 10, 2004, which is hereby incorporated by reference.

BACKGROUND OF THE INVENTION

1. Field of the Invention

The present invention relates to a liquid crystal display device, and more particularly to an adaptive liquid crystal display panel that reduces picture quality deterioration, and a fabricating method thereof.

2. Discussion of the Related Art

Generally, a liquid crystal display (hereinafter, referred to as "LCD") device has liquid crystal cells arranged in a matrix in a liquid crystal display panel to control a light transmittance of the liquid crystal in accordance with a video signal, thereby displaying a picture. For this, the liquid crystal display device includes the liquid crystal display panel where the liquid crystal cells are arranged in a matrix and a drive circuit to drive the liquid crystal display panel.

FIG. 1 is a block diagram partially representing a related art liquid crystal display panel.

The liquid crystal display panel shown in FIG. 1 includes a picture display device 96 having a liquid crystal cell matrix, data pads DP for applying a drive signal to a data line DL, and gate pads for sequentially applying a scan signal to the gate line GL of the picture display part 96.

The data pads DP and the gate pads GP connect to a TCP (tape carrier package: not shown) on which there are mounted a data driver (not shown) for generating the data signal and a gate driver (not shown) for generating the gate signal.

The gate driver sequentially supplies the scan signal to the corresponding gate line GL through each of the gate pads GP.

The data driver supplies the video signal to the corresponding data line DL through each of the data pads DP whenever the scan signal is supplied to the corresponding gate line GI.

The picture display device 96 has the liquid crystal cells LC arranged in a matrix to display a picture. Each of the liquid crystal cells LC includes a thin film transistor 6 (hereinafter, referred to as "TFT") connected to the gate line GL and the data line DL. The TFT 6 has the liquid crystal cell LC charged with the video signal from the data line DL in response to the scan signal supplied to the gate line GL. The liquid crystal with dielectric anisotropy reacts to the charged video signal so that the liquid crystal cell LC controls the light transmittance to realize a specified gray level.

On the other hand, the TFT substrate manufactured by a plurality of patterning processes and goes through an inspection process for detecting whether or not the signal line is bad and whether or not the TFT is bad, for example, a short of the signal line.

The inspection of the signal line of the TFT substrate uses first and second shorting bars and a shorting ling commonly connected to each of the first and second shorting bars.

The first shorting bar applies the inspection signal to the data pad through the shorting line commonly connected to the second shorting bar to inspect whether or not the TFT substrate is bad after completing the TFT array substrate.

The TFT array substrate after being judged to be good through the inspection has liquid crystal injected after being joined to a color filter (hereinafter, referred to as "CF"). The CF array substrate and the TFT array substrate to which the liquid crystal is injected have the first shorting bar removed by a scribing process. Then, the inspection signal is applied to the data pad through the second shorting bar to inspect each pixel after the liquid crystal injection.

FIG. 2 is a sectional diagram representing an inspection wire line for inspecting the related art liquid crystal display panel, and FIG. 3 is a diagram representing a slanting bare spot shown in a picture display part of the related art liquid crystal display panel.

Referring to FIG. 2, the related art liquid crystal display panel uses an organic insulating material 44 that may include BCB and acrylic resin as a passivation film 50. The organic passivation film 50 formed at an outer area of the liquid crystal display panel is formed on a lower substrate 42 where a step difference (d) is formed between the shorting lines OSL, ESL and the gate insulating film 44, i.e., the step difference (d) has a depth equal to a height of odd and even shorting lines OSL, ESL.

Herein, the organic passivation film 50 is evenly formed by a spin coating method, but there is a problem in that the organic insulating material is not uniform to the outer part of the liquid crystal display panel. Specifically, the shorting bar, the shorting line OSL, ESL, the data pad in the outer area of the liquid crystal display panel block the spread of and the organic passivation film 50 due to the step formed by the shorting bar, the shorting line OSL, ESL, and the data pad, thereby resulting in a bare spot in the outer part of the liquid crystal display panel 96. The bare spot, as shown in FIG. 3, expands into a display area, and the bare spot in the display area deteriorates the picture quality of the liquid crystal display panel. The bare spot caused by the step becomes more prominent due to an ohmic contact layer 48 and a semiconductor layer 14 in a lower part of a data pad lower electrode 36. The ohmic contact layer 48 and the semiconductor layer 14 of the data pad are formed to improve the adhesive strength between the data pad lower electrode 36 and the gate insulating film 44, but there is a problem in that the semiconductor layer 14 and the ohmic contact layer 48 cause the step difference (d) between the data pad lower electrode 36 and the gate insulating film 44 to be larger.

SUMMARY OF THE INVENTION

Accordingly, the present invention is directed to a liquid crystal display panel and fabricating method thereof that substantially obviates one or more of the problems due to limitation and disadvantages of the related art.

Accordingly, an advantage of the present invention is to provide a liquid crystal display panel that reduce picture quality deterioration and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel according to an aspect of the present invention includes a first shorting bar inspecting a signal line in a non-display area of a first substrate; a second shorting bar inspecting the signal line in the non-display area of the inspected first substrate attached to a second substrate; a first shorting line connected to at least one of the signal lines and the first and second shorting bars; and a second shorting line connected to the second shorting bar with the remaining signal line except the signal line connected to the first shorting line.

In another aspect of the present invention, a fabricating method of a liquid crystal display panel includes forming first and second shorting bars inspecting a signal line in a non-display area, a first shorting line connected to at least one of the signal lines and the first and second shorting bars, and a second shorting line connected to the second shorting bar with the remaining signal line except the signal line connected to the first shorting line on a first substrate; forming an organic passivation film on the first substrate; inspecting whether or not the signal line is bad using the first shorting bar; removing the first shorting bar using a scribing process; joining the scribed first substrate to a second substrate with a liquid crystal layer; detecting whether or not the signal line is bad using the second shorting bar; and removing the second shorting bar using a grinding process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to embodiments of the present invention, examples of which are illustrated in the accompanying drawings.

With reference to FIGS. 4 to 10C, embodiments of the present invention will be explained as follows.

Figure 1:
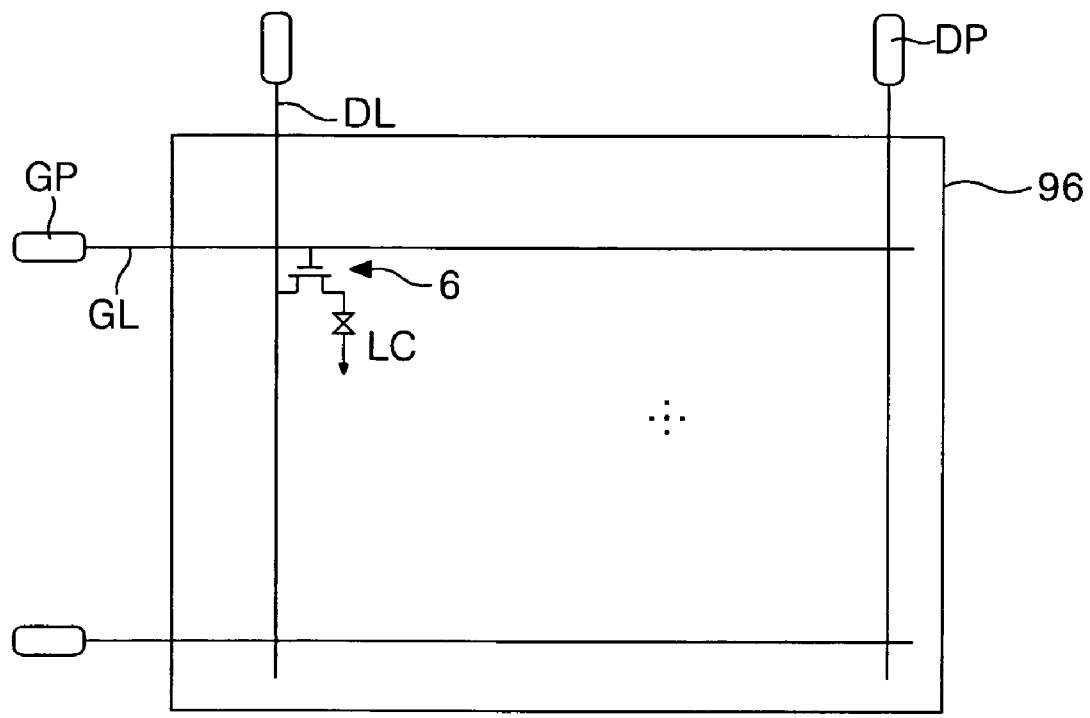
FIG. 1 is a block diagram partially representing a related art liquid crystal display panel.
Figure 2:
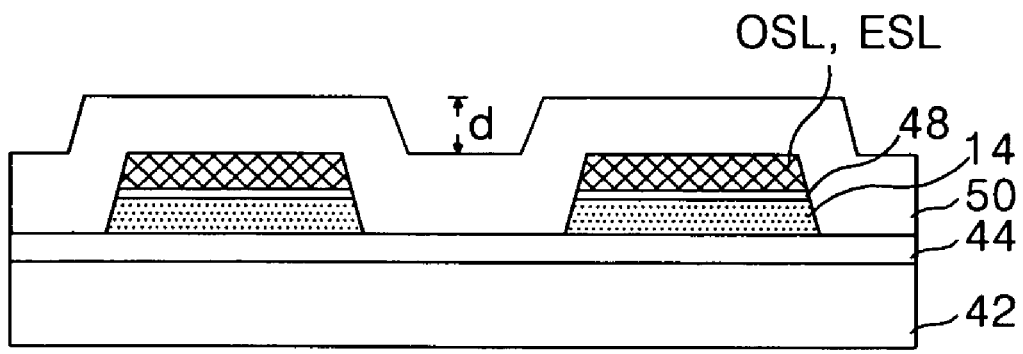
FIG. 2 is a sectional diagram representing an inspection wire line for inspecting the related art liquid crystal display panel.
Figure 3:
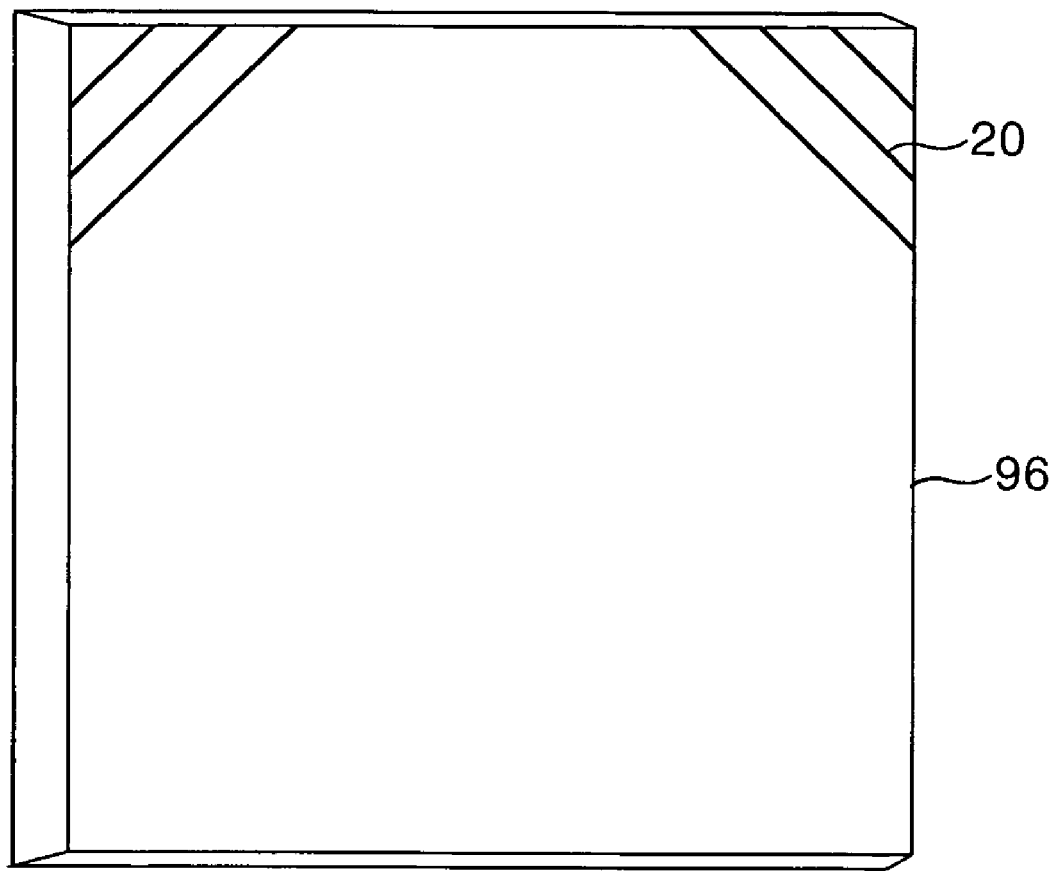
FIG. 3 is a diagram representing a bare spot shown in a picture display of the related art liquid crystal display panel.
Figure 4:
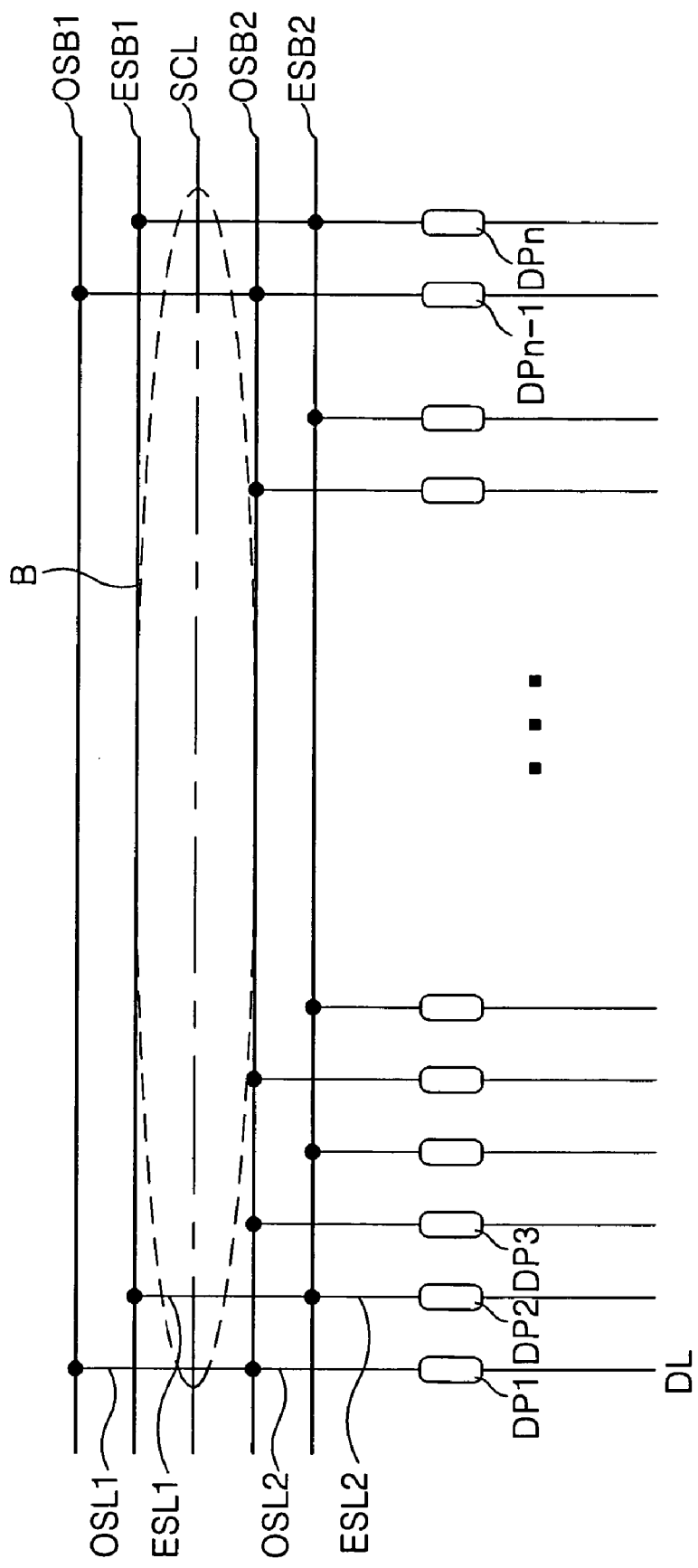
FIG. 4 is a plane view representing an inspection wire line for inspecting a liquid crystal display panel according to a first embodiment of the present invention.

FIG. 4 is a plane view representing an inspection wire line for inspecting a liquid crystal display panel according to a first embodiment of the present invention.

Referring to FIG. 4, a liquid crystal display panel has an inspection performed on a signal line by use of first and second shorting bars formed in the outer part of a TFT array substrate after forming the TFT array substrate.

The first shorting bar includes a first odd shorting bar OSB1 connected to at least one of odd data pads ODP, and a first even shorting bar ESB1 connected to at least one of even data pads EDP. The first odd shorting bar OSB1 is connected to the odd data pad ODP through a first odd shorting line OSL1 that is commonly connected to a second odd shorting bar OSB2. Further, the first even shorting bar ESB1 is connected to an even data pad EDP through a first even shorting line ESL1 that is commonly connected to a second even shorting bar ESB2.

The second odd and even shorting line OSL2, ESL2 except for the first odd and even shorting lines OSL1, ESL1 which are commonly connected to the first and second shorting bars OSB1, ESB1, OSB2, ESB2 connect the second shorting bars OSB2, ESB2 with the remaining data pads DP.

The defect inspection of the signal line and the TFT array substrate of the liquid crystal display panel is performed through the first shorting bars OSB1 and ESB1 after forming the TFT array substrate. Later, the first shorting bars OSB1 and ESB1 are removed by the scribing process where the substrate is scribed along a scribing line SCL.

The second shorting bar includes the second odd shorting bar OSB2 connected to each odd data pad ODP through the second odd shorting lines OSL2, and the second even shorting bar ESB2 connected to each even data pad EDP through the second even shorting lines ESL2. The second shorting bar OSB2, ESB2 is used for an inspection to determine whether or not each pixel is bad after the TFT array substrate is joined to the CF substrate and liquid crystal is formed therebetween. Later, the second shorting bars OSB2, ESB2 are removed during a grinding process.

In this way, the liquid crystal display panel according to the first embodiment of the present invention is formed so that the number of first odd and even shorting lines OSL1, ESL2 commonly connected to the first shorting bar OSB1, ESB1 and the second shorting bars OSB2, ESB2 is reduced. Accordingly, the number of the first odd and even shorting lines OSL1, ESL2, which may be an obstacle when coating the organic passivation film 150, is less than in the related art. Thus a step area that causes a bare spot to be generated is reduced more than in the related art, thereby preventing the bare spot from expanding into the display area. Accordingly, the picture quality deterioration of the liquid crystal display panel is reduced.

Figure 5:
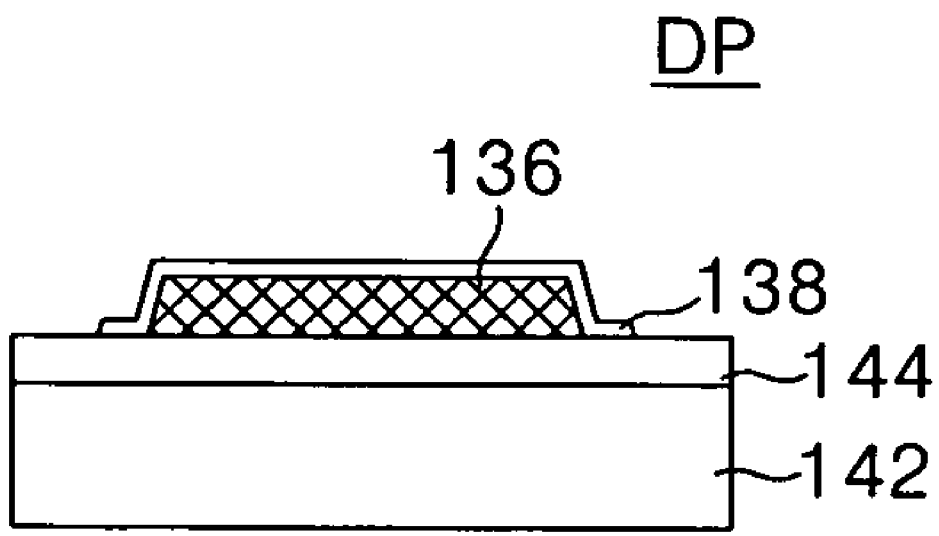
FIG. 5 is a sectional diagram representing a data pad of a liquid crystal display panel according to a second embodiment of the present invention.

FIG. 5 is a sectional diagram representing a data pad of a liquid crystal display panel according to the second embodiment of the present invention.

Hereafter, there will be omitted a detail description for components of the display area except for components of the data pad DP which is formed in a non-display area in relation to the second embodiment of the present invention.

Referring to FIG. 5, the data pad DP according to the second embodiment of the present invention includes a data pad lower electrode 136 that extends from the data line of the display area formed on a gate insulating film 144 and a data pad upper electrode 138 that is directly connected to the data pad lower electrode 136. Herein, an organic passivation film is not formed over the data pad DP of the second embodiment of the present invention.

At this moment, a semiconductor layer and an ohmic contact layer are not formed at the lower part of the data pad lower electrode 136 which is different than the related art, thus the step difference between the gate insulating film 144 and the data pad DP is less than in the related art so that the bare spot generation is reduced. Accordingly, when coating the organic passivation film in the display area, the step difference formed at the outer part of the display area is reduced to decrease the bare spot generation, and the picture quality deterioration of the liquid crystal display panel may be reduced.

Figure 6:
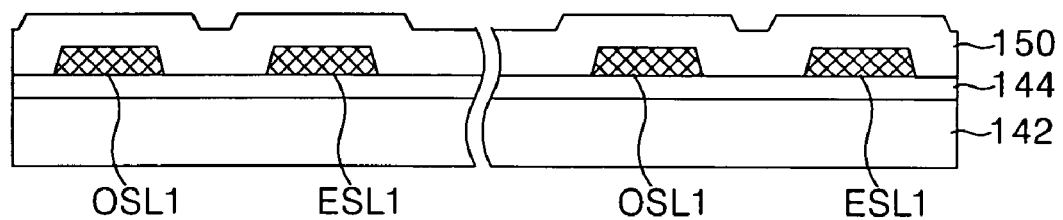
FIG. 6 is a sectional diagram representing a B area shown in FIG. 4 which are realized in both of the first and second embodiments.

Also, the second embodiment of the present invention and the first embodiment of the present invention may be realized together, as shown in FIG. 6. The number of the first odd and even shorting lines OSL1, ESL1 which may be an obstacle when coating the organic passivation film is less than in the related art so as to reduce the step difference area that causes bare spot generation, and the bare spot generation is further reduced because the step difference of the first odd and even shorting lines OSL1, ESL1 is reduced. Accordingly, a bare spot is further prevented from expanding into the display area.

Figure 7A:
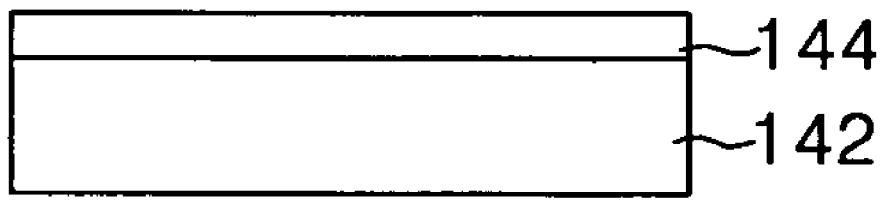
FIGS. 7A to 7C are sectional diagrams representing a fabricating method of a data pad of the liquid crystal display panel according to the second embodiment of the present invention.
Figure 7B:
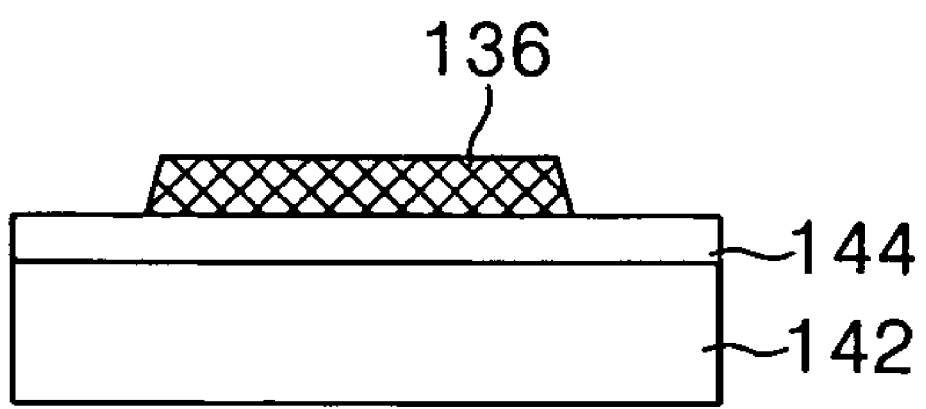
Figure 7C:
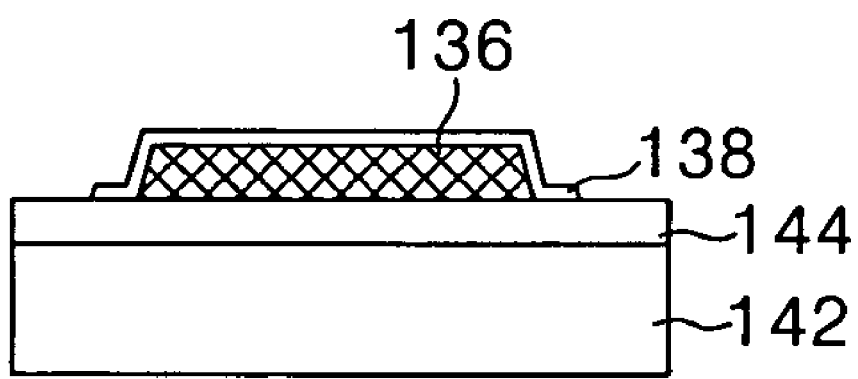

FIGS. 7A to 7C are sectional diagrams representing a step by step fabrication method of a data pad of the liquid crystal display panel according to the second embodiment of the present invention.

Referring to FIG. 7A, the gate line and the gate electrode (not shown) are formed in the display area on the lower substrate 142, and gate metal patterns having a gate pad lower electrode are formed in the non-display area. Next, a gate insulating film 144 is formed over the lower substrate 142 where the gate metal patterns are formed.

Referring to FIG. 7B, a semiconductor pattern having an active layer and an ohmic contact layer, a data line, a source electrode, a drain electrode and a storage upper electrode are formed in the display area on the gate insulating film 144. Source/drain metal patterns having a data pad lower electrode 136 are substantially sequentially formed in the non-display area.

A gate insulating film 144, an amorphous silicon layer, an n+ amorphous silicon layer and a source/drain metal layer are sequentially formed by a deposition method such as sputtering on the lower substrate 142 where the gate metal patterns are formed. Herein, an inorganic insulating material such as silicon oxide SiOx or silicon nitride SiNx is used as a material of the gate insulating film 144. The source/drain metal is formed of a molybdenum Mo, titanium Ti, tantalum Ta, molybdenum Mo alloy and so on.

Then, an organic passivation film having the first and second contact holes is formed in the display area on the gate insulating film 144 where the source/drain metal pattern is formed.

Particularly, an organic material for forming the organic passivation film is deposited over the entire surface in the display area on the gate insulating film 144 where the source/drain metal patterns are formed. Subsequently, the organic passivation film is patterned by a photolithography process and an etching process, thereby forming contact holes. The first contact hole is formed to penetrate the organic passivation film to expose the drain electrode. The second contact hole is formed to penetrate the organic passivation film to expose the storage upper electrode.

The material of the organic passivation film is an organic insulating material such as BCB, PFCB or an acrylic organic compound of low dielectric constant for high aperture ratio.

Referring to FIG. 7C, a pixel electrode is formed on the organic passivation film of the display area, and transparent conductive film patterns having the gate pad upper electrode and the data pad upper electrode is formed in the non-display area.

To describe this more specifically, a transparent conductive film is formed by a deposition method such as sputtering in the non-display area and the organic passivation film of the display area. Subsequently, the transparent conductive film is patterned through the photolithography process and the etching process, thereby forming transparent conductive film patterns inclusive of the data pad upper electrode 138, the gate pad upper electrode of the non-display area and the pixel electrode of the display area. The pixel electrode is electrically connected to the drain electrode through the first contact hole and electrically connected to the storage upper electrode that overlaps the pre-stage gate line through the second contact hole. The transparent conductive film is formed of indium tin oxide ITO, tin oxide TO, indium zinc oxide IZO and so on.

Figure 8:
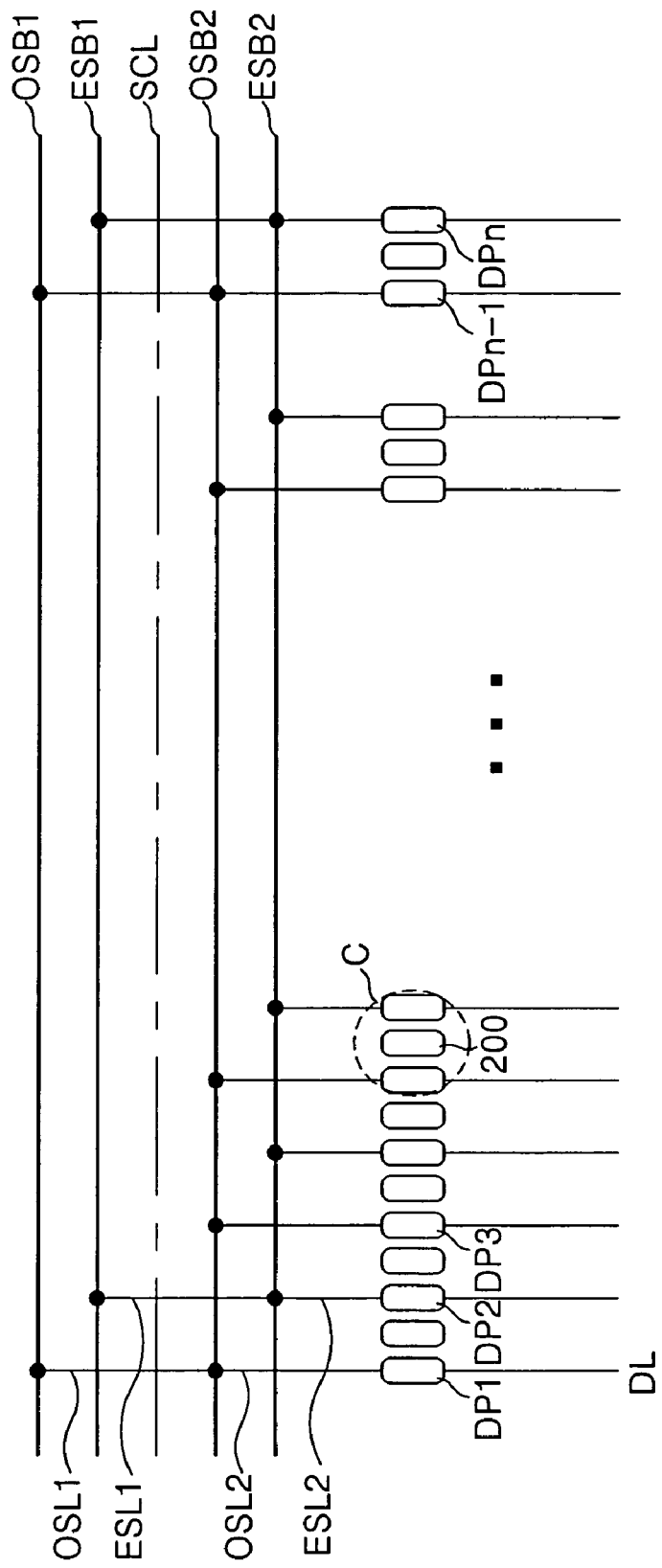
FIG. 8 is a plane view representing an inspection wire line for inspecting a liquid crystal display panel according to a third embodiment of the present invention.
Figure 9:
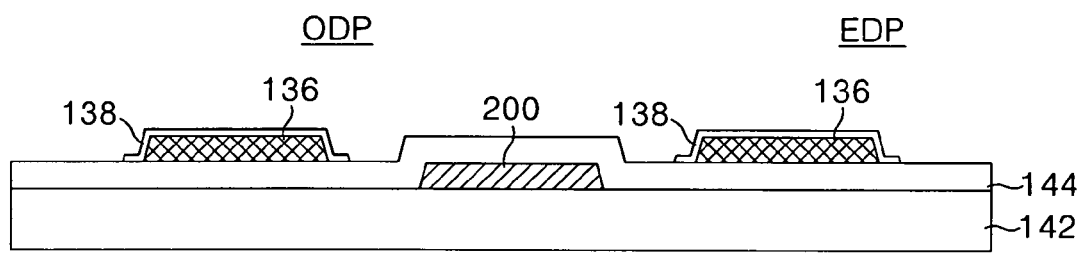
FIG. 9 is a sectional diagram representing a C area shown in FIG. 8.

FIG. 8 is a plane view representing a data pad of a liquid crystal display panel according to a third embodiment of the present invention, and FIG. 9 is a sectional diagram representing a C area shown in FIG. 8.

Hereafter, there will be omitted a detailed description for components of the display area except for components of the data pad DP which is formed in a non-display area in relation to the third embodiment of the present invention.

Referring to FIGS. 8 and 9, the third embodiment of the present invention further includes a gate dummy pattern 200 between the odd data pattern ODP and the even data pattern EDP.

The gate dummy pattern 200 is formed by the same process when the gate metal patterns inclusive of the gate pad lower electrode of the non-display area and the gate electrode and the gate line of the display area. No signal is applied to the gate dummy pattern 200.

The odd and even data pads ODP, EDP includes a data pad lower electrode 136 which is extended from the data line of the display area formed on the gate insulating film 144, and a data pad upper electrode 138 that is directly connected to the data pad lower electrode 136. Herein, the organic passivation film is not formed over the data pad DP of the third embodiment of the present invention.

In this case, a semiconductor layer and an ohmic contact layer are not formed on the lower part of the data pad lower electrode 136 of the third embodiment of the present invention which is different from the related art. The gate dummy pattern 200 is on the lower substrate 142 under the gate insulating film 144 between the odd data pad ODP and the even data pad EDP, thus the step difference between the gate insulating film 144 and the data pad DP is less than in the related art to reduce the bare spot generation. Accordingly, when coating the organic passivation film in the display area, the step difference formed at the outer part of the display area is reduced to reduce the bare spot generation and the picture quality deterioration of the liquid crystal display panel.

Additionally, if the third embodiment of the present invention and the first embodiment of the present invention are realized together, the number of the first odd and even shorting lines OSL1, ESL1 is reduced which may be an obstacle when coating the organic passivation film 15, as in the second embodiment of the present invention, thus the step difference generation area which generates the bare spot is reduced more than in the related art. The step difference of the first odd and even shorting lines OSL1, ESL1 is reduced to reduce the bare spot generation more. Accordingly, the bare spot is prevented from expanding into the display area.

Figure 10A:
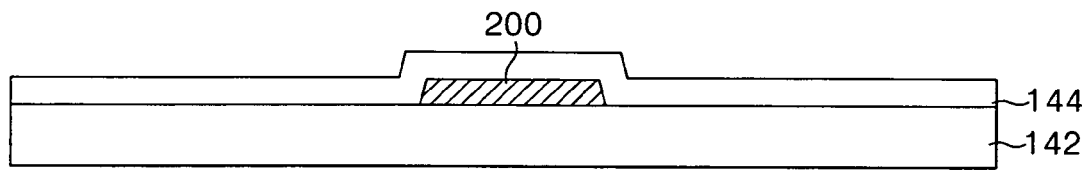
FIGS. 10A to 10C are sectional diagrams representing a fabricating method of a data pad of the liquid crystal display panel according to the third embodiment of the present invention.
Figure 10B:
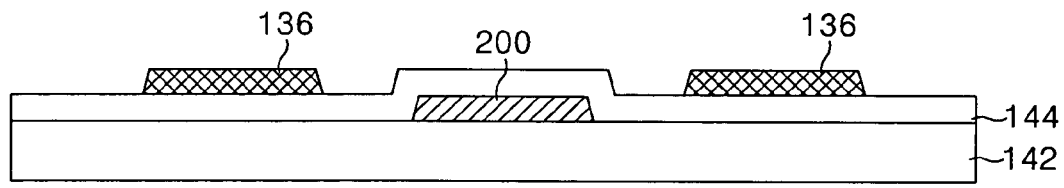
Figure 10C:
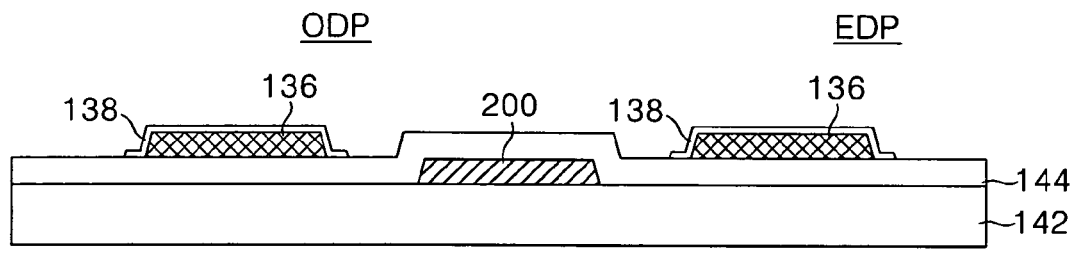

FIGS. 10A to 10C are sectional diagrams representing a fabricating method of a data pad of the liquid crystal display panel according to the third embodiment of the present invention.

Referring to FIG. 10A, the gate line and the gate electrode are formed in the display area on the lower substrate 142, and gate metal patterns having a gate pad lower electrode and a gate dummy pattern 200 are formed in the non-display area. A gate insulating film 144 is formed over the lower substrate 142 where the gate metal patterns are formed.

Referring to FIG. 10B, a semiconductor pattern including an active layer and an ohmic contact layer, a data line, a source electrode, a drain electrode, and a storage upper electrode are formed in the display area on the gate insulating film 144. Source/drain metal patterns having a data pad lower electrode 136 are substantially sequentially formed with the gate dummy pattern 200 therebetween in the non-display area.

A gate insulating film 144, an amorphous silicon layer, an n+ amorphous silicon layer and a source/drain metal layer are substantially sequentially formed by a deposition methods such as sputtering on the lower substrate 142 where the gate metal patterns are formed. Herein, an inorganic insulating material such as silicon oxide SiOx or silicon nitride SiNx is used as the material of the gate insulating film 144. The source/drain metal is formed of a molybdenum Mo, titanium Ti, tantalum Ta, molybdenum Mo alloy, etc.

Then, an organic passivation film including a first and second contact hole is formed in the display area on the gate insulating film 144 where the source/drain metal pattern is formed.

An organic material for forming the organic passivation film is deposited Lover the entire surface in the display area on the gate insulating film 144 where the source/drain metal patterns are formed. Subsequently, the organic passivation film is patterned by a photolithography process and an etching process, thereby forming contact holes. The first contact hole is formed to expose the drain electrode. The second contact hole is formed to expose the storage upper electrode.

The material of the organic passivation film is an organic insulating material such as BCB, PFCB or an acrylic organic compound having low dielectric constant for high aperture ratio.

Referring to FIG. 10C, a pixel electrode is formed on the organic passivation film of the display area, and transparent conductive film patterns having the gate pad upper electrode and the data pad upper electrode is formed in the non-display area.

To describe this more specifically, a transparent conductive film is formed by a deposition method such as sputtering in the non-display area and the organic passivation film of the display area. Subsequently, the transparent conductive film is patterned through the photolithography process and the etching process, thereby forming transparent conductive film patterns inclusive of the data pad upper electrode 138, the gate pad upper electrode of the non-display area, and the pixel electrode of the display area. The pixel electrode is electrically connected to the drain electrode through the first contact hole and electrically connected to the storage upper electrode that overlaps the pre-stage gate line through the second contact hole. The transparent conductive film is formed of indium tin oxide ITO, tin oxide TO, indium zinc oxide IZO, etc.

As described above, the liquid crystal display panel and a fabricating method thereof according to the present invention can reduce the bare spot generation which is generated when coating the organic passivation film by reducing the number of the first shorting lines that connect the data pad with the first odd and even shorting bars. Further, the semiconductor layer and the ohmic contact layer are not formed in the lower part of the data pad lower electrode, thus the height difference between the gate insulating film and the data pad themselves can be reduced. In addition, the gate dummy pattern is formed between the data pads, thus the stepped difference between the gate insulating film and the data pad can further be reduced. Accordingly, the difference of the data pad and the gate insulating film of the liquid crystal display panel is reduced, thus the slanting bare spot shown in the outer part of the picture display part can be reduced and the picture quality deterioration of the liquid crystal display panel is reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel, comprising:
   a first shorting bar inspecting a data line and located in a non-display area of a first substrate;
   a second shorting bar inspecting the data line and located in the non-display area of the inspected first substrate attached to a second substrate;
   a first shorting line connected to at least one of the data lines and the first and second shorting bars and located in non-display area of the first substrate;
   a second shorting line connected the second shorting bar with a remaining data line except a portion of the data line connected to the first shorting line and located in non-display area of the first substrate; and
   a data pad between the first and second shorting lines and the data line;
   wherein the first shorting line is located between the first shorting bar and the data pad, and the second shorting line is located between the second shorting bar and the data pad.

2. The liquid crystal display panel according to claim 1, wherein the data pad includes:
   a data pad lower electrode on the gate insulating film; and
   a data pad upper electrode connected to the data pad lower electrode.

3. The liquid crystal display panel according to claim 1, further comprising a gate dummy pattern between the data pads.

4. The liquid crystal display panel according to claim 3, wherein the gate dummy pattern is formed of the same material as the gate line.

5. The liquid crystal display panel according to claim 1, further comprising an organic passivation film in a display area and not in the non-display area.

6. A fabricating method of a liquid crystal display panel, comprising:
   forming first and second shorting bars inspecting a signal line in a non-display area, a first shorting line connected to at least one of the signal lines and the first and second shorting bars, and a second shorting line connected the second shorting bar with the remaining signal line except a portion of the signal line connected to the first shorting line on a first substrate;
   forming an organic passivation film on the first substrate;
   inspecting whether or not the signal line is bad using the first shorting bar;
   removing the first shorting bar using a scribing process;

attaching the scribed first substrate to a second substrate with a liquid crystal layer;

detecting whether or not the signal line is bad using the second shorting bar; and removing the second shorting bar using a grinding process.

7. The method according to claim 6, wherein the signal line is at least one of a gate line and a data line.

8. The method according to claim 7, further comprising forming a data pad between the first and second shorting lines and the data line.

9. The method according to claim 8, wherein forming the data pad includes:

forming a data pad lower electrode on the gate insulating film; and forming a data pad upper electrode connected to the data pad lower electrode.

10. The method according to claim 8, further comprising forming a gate dummy pattern between the data pads.

11. The method according to claim 10, wherein the gate dummy pattern is formed of the same material as the gate line at the same time.

12. The method according to claim 10, wherein the gate dummy pattern and the gate line are substantially simultaneously formed.

13. The method according to claim 6, wherein the organic passivation film is exposed for the first and second shorting bars and the first and second shorting lines.

* * * * *